(12) United States Patent
Okano

(10) Patent No.: US 7,866,755 B2
(45) Date of Patent: Jan. 11, 2011

(54) OTTOMAN FOR VEHICLE SEATS

(75) Inventor: Ritsuro Okano, Yokohama (JP)

(73) Assignee: NHK Spring Co., Ltd., Yokohama-Shi (JP)

( * ) Notice: Subject to any disclaimer, the term of this patent is extended or adjusted under 35 U.S.C. 154(b) by 0 days.

(21) Appl. No.: 12/232,068

(22) Filed: Sep. 10, 2008

(65) Prior Publication Data

US 2009/0096272 A1  Apr. 16, 2009

(30) Foreign Application Priority Data

Sep. 13, 2007  (JP)  ............................. 2007-237530

(51) Int. Cl.
*A47C 7/50* (2006.01)
(52) U.S. Cl. .................. 297/423.3; 297/68; 297/423.26; 297/423.1
(58) Field of Classification Search ............. 297/423.1, 297/423.26, 423.3, 68
See application file for complete search history.

(56) References Cited

U.S. PATENT DOCUMENTS

| 4,516,805 | A | * | 5/1985 | Leeper et al. ................ 297/330 |
| 5,061,010 | A | * | 10/1991 | LaPointe .................... 297/325 |
| 5,368,366 | A | * | 11/1994 | Mizelle ................... 297/423.3 |
| 5,507,562 | A | * | 4/1996 | Wieland .................. 297/423.2 |
| 5,782,535 | A | * | 7/1998 | Lafer ..................... 297/423.36 |
| 5,975,627 | A | * | 11/1999 | LaPointe et al. .............. 297/68 |
| 6,095,610 | A | * | 8/2000 | Okajima et al. ........ 297/423.36 |
| 6,612,650 | B1 | * | 9/2003 | Ambrosio et al. ........... 297/330 |
| 6,663,184 | B2 | * | 12/2003 | Hagiike .................... 297/423.3 |
| 7,156,462 | B2 | * | 1/2007 | Verny et al. ............ 297/354.13 |
| 7,229,134 | B2 | * | 6/2007 | Ito ........................ 297/423.26 |

FOREIGN PATENT DOCUMENTS

| JP | A-11-332688 | 12/1999 |
| JP | A-2006-239291 | 9/2006 |

* cited by examiner

*Primary Examiner*—David Dunn
*Assistant Examiner*—Erika Garrett
(74) *Attorney, Agent, or Firm*—Oliff & Berridge PLC

(57) ABSTRACT

An ottoman apparatus for a vehicle seat includes a driving shaft with an end which is tiltably connected to a front end of the seat, and includes a supporting frame connected to the driving shaft so as to be linearly movable over the driving shaft. The supporting frame is movable between a stowage position below the front end of the seat and a foot resting position in front of the seat. The supporting frame and the driving shaft are approximately vertically arranged when the supporting frame is stopped at the stowage position below the front end of the seat. The driving shaft is tilted to a substantially horizontal position by linearly moving the supporting frame over the driving shaft according to the movement of the supporting frame to the foot resting position in front of the seat.

12 Claims, 5 Drawing Sheets

OTTOMAN FOR VEHICLE SEATS

BACKGROUND OF THE INVENTION

1. Technical Field

The present invention relates to an ottoman apparatus that is movable between a stowage position below a front end of a vehicle seat and a foot resting position in front of the vehicle seat, and in particular, the present invention relates to an ottoman apparatus including a driving shaft that tilts.

2. Background Art

As a footrest that may be used by placing the footrest in front of a chair or a sofa, an ottoman is generally used. An ottoman apparatus is used as an ottoman, and the ottoman apparatus can be stowed when it is not needed and can be extended to a foot resting position when necessary. For example, an ottoman apparatus is disclosed in Japanese Patent Application Laid-Open No. 11-332688. In this ottoman apparatus, a supporting frame of a footrest member is connected to a front portion of a vehicle seat, and the supporting frame is movable between a stowage position below a front end of the seat and a foot resting position in front of the seat. An electric motor for a driving source of the ottoman apparatus, and a screw shaft that can be rotated by the electric motor, are approximately horizontally arranged under the seat. A primary link includes a nut that is threadably mounted to the screw shaft, and the primary link horizontally moves backward and forward relative to the seat according to the screw shaft and pushes out a tilting link device, whereby the supporting frame is moved to the foot resting position.

In the ottoman apparatus disclosed in Japanese Patent Application Laid-Open No. 11-332688, power from the electric motor is transmitted from the screw shaft to the primary link, the tilting link device, and the supporting structure, in this order. Another ottoman apparatus is disclosed in Japanese Patent Application Laid-Open No. 2006-239291, for example, and power from an electric motor is output to a rotational center of a tilting link device. In this ottoman apparatus, the electric motor rotates the rotational center of the tilting link device, whereby a supporting frame can be moved between a stowage position and a foot resting position.

SUMMARY OF THE INVENTION

When an ottoman apparatus is mounted at a rear seat of a sedan-type automobile, for example, there may be a case in which a space under the seat is not available because a frame of the automobile body is disposed just under the seat. There may be other cases in which an air-conditioner for sending an airflow from the seat and a power device for moving the seat are disposed in the space under the seat.

In the ottoman apparatus disclosed in Japanese Patent Application Laid-Open No. 11-332688, since the electric motor and the screw shaft require the space under the seat, vehicles in which the ottoman apparatus can be mounted are limited, and designs of seats and vehicles may be limited. On the other hand, the ottoman apparatus disclosed in Japanese Patent Application Laid-Open No. 2006-239291 does not use the space under the seat. In this ottoman apparatus, since the electric motor rotates the rotational center of the tilting link device, a large rotative power is required, and an electric motor and an electric power for the rotative power are necessary, whereby the production cost is increased.

In these conventional ottoman apparatuses, the power of the electric motor is transmitted to the supporting frame via the tilting link device, whereby the power is dispersed in directions that differ from the moving direction of the supporting frame and is transmitted. Therefore, the amount of power transmitted to the supporting frame is smaller than the amount of power output from the electric motor. Accordingly, for example, when a relatively heavy person uses the ottoman apparatus, the supporting frame may be moved to a predetermined foot resting position for a longer time, or the supporting frame may not be moved and may stop.

In view of the above circumstances, an object of the present invention is to provide an ottoman apparatus having a small size, in which transmission efficiency of power to a supporting frame is good, and strength for maintaining the supporting frame is large.

In a first aspect of the present invention, the present invention provides an ottoman apparatus including a driving shaft with an end that is tiltably connected to a front end of a seat and including a supporting frame connected to the driving shaft so as to be linearly movable over the driving shaft. The supporting frame is movable between a stowage position below the front end of the seat and a foot resting position in front of the seat. The supporting frame and the driving shaft are approximately vertically arranged when the supporting frame is stopped at the stowage position below the front end of the seat. The driving shaft is tilted to a substantially horizontal position by linearly moving the supporting frame over the driving shaft according to the movement of the supporting frame to the foot resting position in front of the seat.

The "driving shaft" refers to an actuator for linearly moving the supporting frame over the driving shaft. For example, as an actuator, a screw shaft, a solenoid, a pneumatic cylinder, and a hydraulic cylinder may be used. The "supporting frame" refers to a supporting member for supporting the calf of a leg. The "foot resting position in front of the seat" refers to an appropriate position at which a user rests the user's feet on the ottoman apparatus and relaxes, and therefore, the foot resting position is not specifically limited. The "supporting frame and driving shaft are approximately vertically arranged" refers to the supporting frame and the driving shaft being approximately vertically arranged so as not to limit the design of a vehicle body to be mounted with a seat or not to disturb the feet of a user. Specifically, the supporting frame and the driving shaft are arranged within plus or minus 30 degrees with respect to a vertical direction.

According to the first aspect of the present invention, the driving shaft is directly connected to the supporting frame, whereby the power of the driving shaft is directly transmitted to the supporting frame. Therefore, the transmission efficiency of the power to the supporting frame is good compared to that in a case in which a power is transmitted to a supporting frame via another member. The supporting frame and the driving shaft are approximately vertically arranged at the stowage position below the front end of the seat, whereby the ottoman apparatus can be small in size that it does not require a space under the seat. The driving shaft is tilted around an end thereof to a substantially horizontal position as the supporting frame moves to the foot resting position in front of the seat, whereby a transmission direction of the power of the driving shaft is changed to the moving direction of the supporting frame. Therefore, the transmission efficiency of the power to the supporting frame is good.

In a second aspect of the present invention, the driving shaft forms an angle with respect to a vertical direction, and the angle is increased as the supporting frame moves to the foot resting position in front of the seat. According to the second aspect of the present invention, the driving shaft is tilted to the front of the seat, to which the supporting frame moves, whereby the transmission direction of the power of the driving shaft is changed to the moving direction of the supporting frame according to the movement of the supporting frame. Therefore, the transmission efficiency of the power to the supporting frame is good.

In a third aspect of the present invention, the driving shaft is approximately horizontally arranged when the supporting frame is stopped at the foot resting position in front of the seat. According to the third aspect of the present invention, the driving shaft is approximately horizontally arranged at the foot resting position and directly maintains the supporting frame, whereby strength for maintaining the supporting frame is large compared to that of a structure maintaining a supporting frame via other member. In this case, "approximately horizontal position" represents a range of plus or minus 30 degrees with respect to the substantially horizontal position.

In a fourth aspect of the present invention, the ottoman apparatus includes a primary link which is connected to the driving shaft so as to be linearly movable on the driving shaft, and the primary link transmits a power to the supporting frame. The primary link functions as a connecting member for transmitting a power to the supporting frame. According to the fourth aspect of the present invention, the connecting structure of the supporting frame is simple compared to that in a case in which the supporting frame is directly connected to the driving shaft.

In a fifth aspect of the present invention, the driving shaft is a screw shaft engaged with a nut that is tiltably connected to one of the supporting frame and the primary link. According to the fifth aspect of the present invention, the nut linearly moves on the screw shaft in accordance with the rotation of the screw shaft, and the nut moves the supporting frame, which is connected with the nut, to the foot resting position in front of the seat. When the supporting frame is stopped at the foot resting position in front of the seat, the supporting frame is automatically locked at the stopped position by the nut engaging with the screw shaft. Therefore, the strength for maintaining the supporting frame is larger compared to that in a case in which the present invention is not used.

In a sixth aspect of the present invention, the screw shaft has an end, and the ottoman apparatus includes a shaft supporting member for rotatably supporting the end of the screw shaft. According to the sixth aspect of the present invention, the shaft supporting member prevents vibration of the screw shaft, which occurs in accordance with the rotation of the screw shaft, whereby the power of the screw shaft is efficiently transmitted to the supporting frame compared to a case in which the present invention is not used.

In a seventh aspect of the present invention, the ottoman apparatus includes a pair of first tilting links tiltably connected to both sides of the front end of the seat, and the first tilting links are connected to both sides of the supporting frame. According to the seventh aspect of the present invention, the supporting frame is maintained by the pair of first tilting links at both sides thereof, whereby the strength for maintaining the supporting frame is large.

In an eighth aspect of the present invention, the ottoman apparatus includes a pair of second tilting links which are tiltably connected to both sides of the front end of the seat and are connected to the first tilting links, and the first tilting links and the second tilting links set the stowage position below the front end of the seat and the foot resting position in front of the seat. According to the eighth aspect of the present invention, the supporting frame is maintained by the pair of the first tilting links and the pair of the second tilting links at the both sides thereof, whereby the strength for maintaining the supporting frame is large. The supporting frame is smoothly tilted around a virtual rotational center, which is behind a knee of a user, in such a way that the supporting frame is pushed out to the front of the seat, whereby the ottoman apparatus is comfortable for the user.

In a ninth aspect of the present invention, the first tilting links and the second tilting links are approximately vertically folded when the supporting frame is stopped at the stowage position below the front end of the seat. According to the ninth aspect of the present invention, the first tilting link and the second tilting links are approximately vertically arranged below the front end of the seat, whereby the ottoman apparatus can be small in size.

In a tenth aspect of the present invention, the ottoman apparatus includes a connecting rod connecting the pair of the first tilting links or the pair of the second tilting links at both sides of the ottoman apparatus. According to the tenth aspect of the present invention, the connecting rod synchronizes tilting motions of the pair of the first tilting links or tilting motions of the pair of the second tilting links at both sides of the ottoman apparatus. Therefore, the first tilting links or the second tilting links securely maintain the supporting frame without vibrating the supporting frame in right and left direction during extending operation and stowing operation.

According to the present invention, an ottoman apparatus having a small size is obtained. In the ottoman apparatus, the transmission efficiency of power to a supporting frame is good, and the strength for maintaining the supporting frame is high.

PREFERRED EMBODIMENT OF THE INVENTION

1. First Embodiment

In the first embodiment, an example of an ottoman apparatus is described, and the ottoman apparatus includes a driving shaft with an end tiltably connected to a front end of a seat and includes a supporting frame connected to the driving shaft so as to be linearly movable over the driving shaft. The supporting frame is movable between a stowage position below the front end of the seat and a foot resting position in front of the seat.

Structure of the First Embodiment

Figure 1:
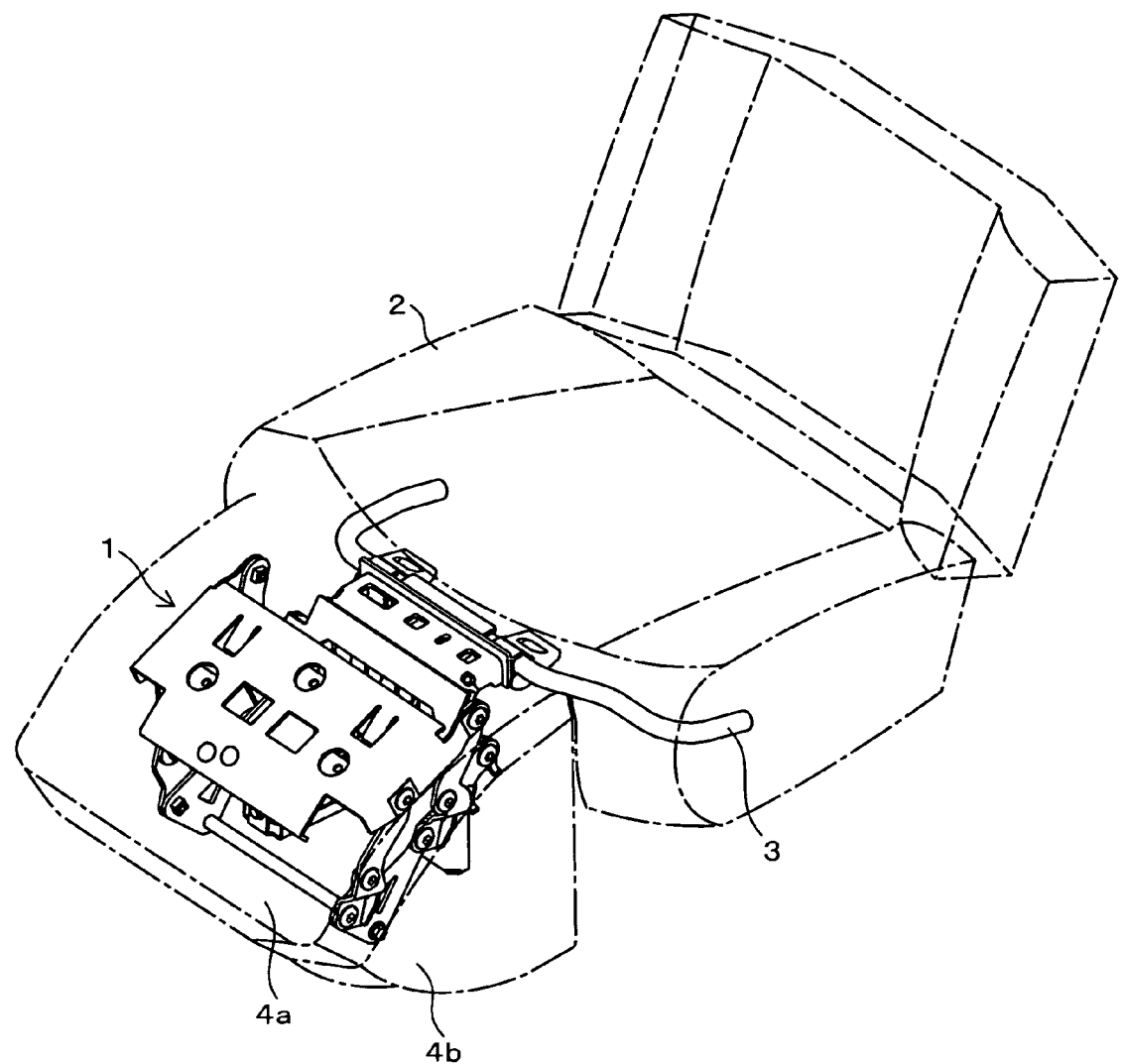
FIG. 1 is a perspective view showing an example of an electrically operated ottoman apparatus mounted to a front end of a seat.
Figure 2:
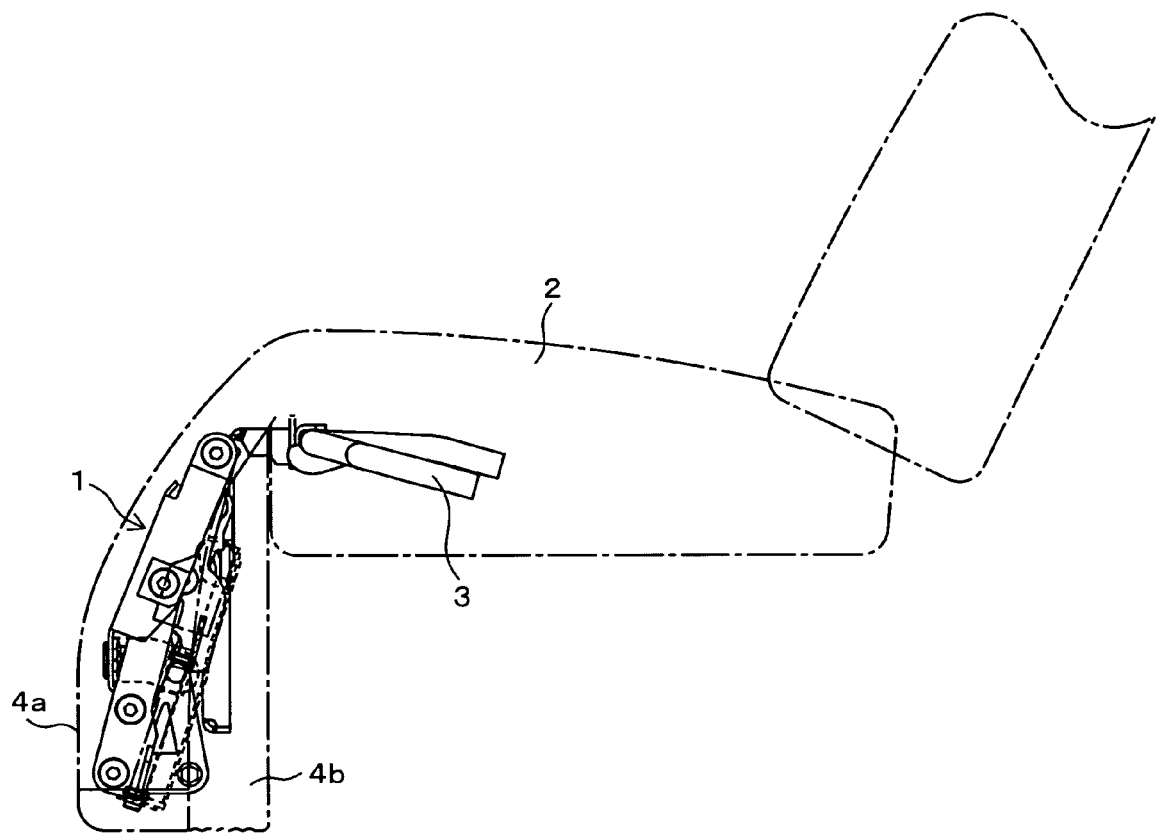
FIG. 2 is a side view showing an example of an electrically operated ottoman apparatus mounted to a front end of a seat.
Figure 3:
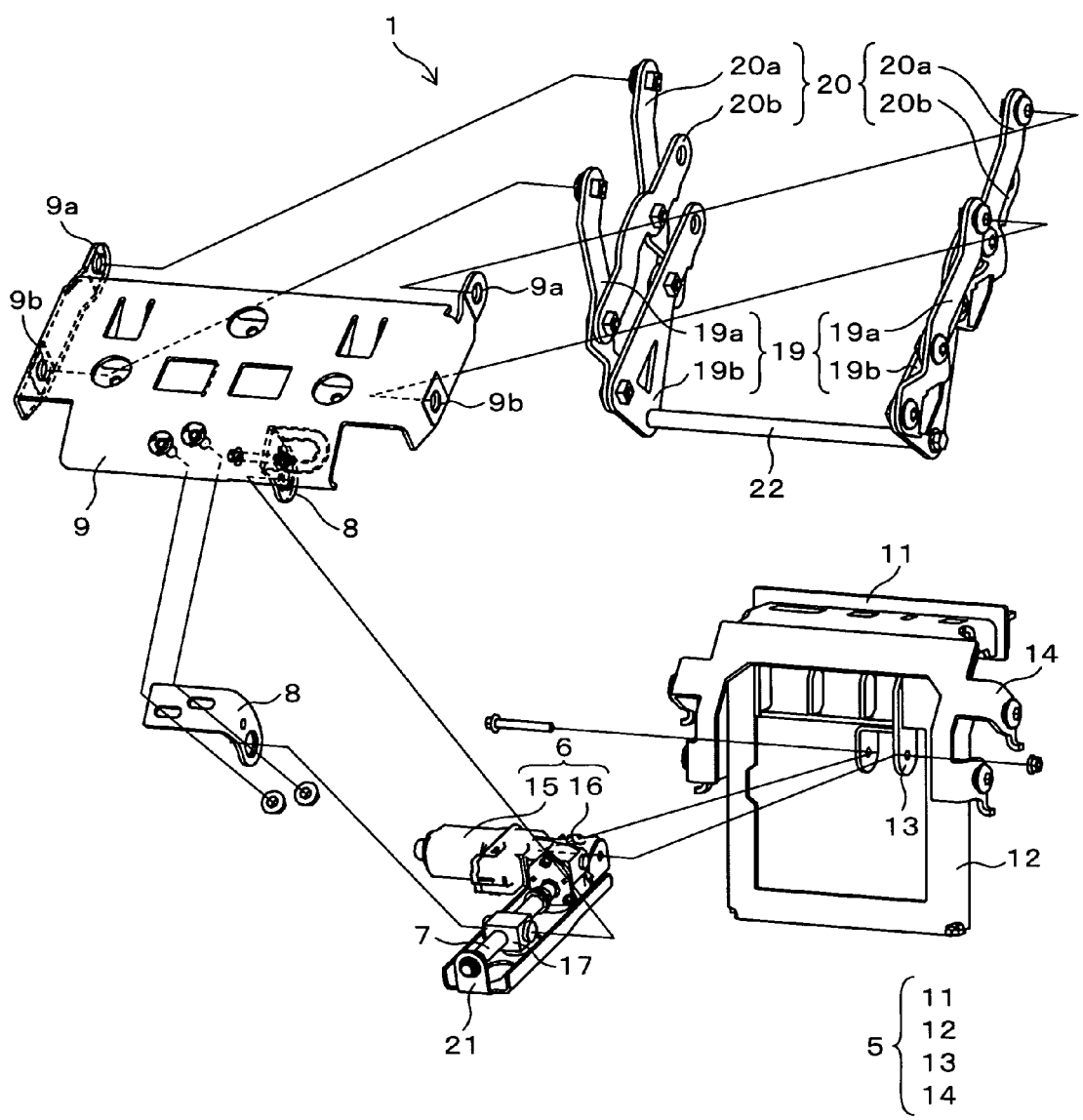
FIG. 3 is an exploded view showing an example of an electrically operated apparatus.
Figure 4:
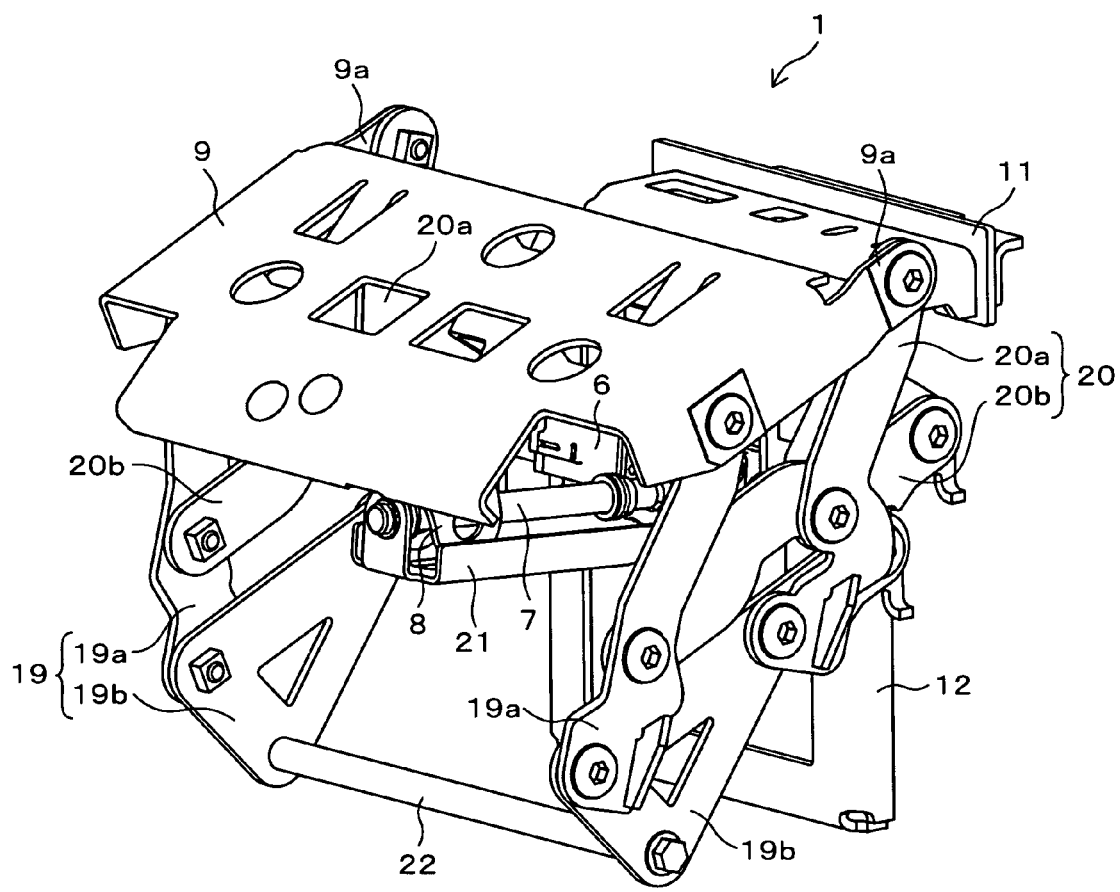
FIG. 4 is a perspective view showing an example of an electrically operated ottoman apparatus.

FIG. 1 is a perspective view showing an example of an electrically operated ottoman apparatus mounted to a front end of a seat, and FIG. 2 is a side view showing an example of an electrically operated ottoman apparatus mounted to a front end of a seat. FIG. 3 is an exploded view showing an example of an electrically operated ottoman apparatus, and FIG. 4 is a perspective view showing an example of an electrically operated ottoman apparatus. As shown in FIG. 1, an electrically operated ottoman apparatus 1 is mounted to a front end of a cushion frame 3 in a seat cushion 2. The outside of the electrically operated ottoman apparatus 1 primarily includes a foot resting cushion 4a and a covering portion 4b. The foot resting cushion 4a is formed by covering a fibrous material with a cloth, leather, or the like, and the foot resting cushion 4a can be moved and be stopped between the foot resting position shown in FIG. 1 and the stowage position shown in FIG. 2. The covering portion 4b is fan-shaped and is made of a cloth, leather, or the like, and the covering portion 4b flexibly covers the front side and both sides of the electrically operated ottoman apparatus 1 so that foreign materials and hands are not caught in the electrically operated ottoman apparatus 1.

As shown in FIG. 3, the electrically operated ottoman apparatus 1 primarily includes a fixing member 5 which can be fixed to the front end of the cushion frame 3, a driving shaft 7 with an end that is tiltably connected to one of the fixing member 5 and the front end of the seat, and a supporting frame 9. The supporting frame 9 is connected to the driving shaft 7 so as to be linearly movable over the driving shaft 7 and is movable between the stowage position below the front end of the seat and the foot resting position in front of the seat. The electrically operated ottoman apparatus 1 may not include the fixing member 5. In this case, each member of the electrically operated ottoman apparatus 1 is directly mounted to the seat. On the other hand, when the electrically operated ottoman apparatus 1 includes the fixing member 5, the electrically operated ottoman apparatus 1 has an assembled structure and can be fixed to the cushion frame 3 by one part, whereby steps of mounting each member are reduced.

The fixing member 5 includes a fixing frame 11, a fixing bracket 12, and a supporting bracket 13. The fixing frame 11 is made of a metallic material and is fixed to the front end of the cushion frame 3 by welding. The fixing bracket 12 is made of a metallic material and is approximately U-shaped, and the fixing bracket 12 is fastened to the front end of the fixing frame 11 by welding. The supporting bracket 13 is fixed at the upper center of the fixing bracket 12. The supporting bracket 13 is a member to which an upper end of the driving shaft 7 is tiltably connected by a bolt.

The driving shaft 7 functions as an actuator for linearly moving the supporting frame 9 over the driving shaft 7. For example, as an actuator, a solenoid, a pneumatic cylinder, and a hydraulic cylinder may be used. Publicly known driving device 6 may be required according to the type of the actuator to be used. For example, when a solenoid is used as the driving shaft 7, the driving device 6 has a publicly known controlling circuit that can switch electricity to the solenoid. When a pneumatic cylinder or a hydraulic cylinder is used as the driving shaft 7, the driving device 6 is not necessary. The driving shaft 7 is operated by an extending switch and a stowing switch (not shown in the figures). The driving shaft 7 is provided with an upper end limiting switch which detects an upper end of the driving shaft 7 and a lower end limiting switch which detects a lower end of the driving shaft 7. The upper end limiting switch and the lower end limiting switch stop the power of the driving shaft 7 in order to stop the supporting frame 9 from linearly moving over the driving shaft 7. In this case, the movement of the supporting frame 9 may be mechanically stopped without stopping the power of the driving shaft 7.

An end of the driving shaft 7 relating to the present invention is tiltably connected to the front end of the seat or the fixing member 5. The other end of the driving shaft 7 is not fixed and is movable between the lower portion of the front end of the seat and the front of the seat. The driving shaft 7 is connected with the supporting frame 9 so that the supporting frame 9 is linearly movable in the axial direction of the driving shaft 7. For example, when a solenoid is used as the driving shaft 7, the supporting frame 9 is tiltably connected to a core of the solenoid. Since the core of the solenoid linearly moves in the axial direction, the supporting frame 9 connected to the core also linearly moves in the axial direction. When a pneumatic cylinder or a hydraulic cylinder is used as the driving shaft 7, the supporting frame 9 is tiltably connected to a piston of the pneumatic cylinder or a piston of the hydraulic cylinder. Since the piston of the pneumatic cylinder or the piston of the hydraulic cylinder linearly moves in the axial direction thereof, the supporting frame 9 connected to the piston also linearly moves in the axial direction. According to this structure, the power of the driving shaft 7 is directly transmitted to the supporting frame 9. Therefore, the transmission efficiency of the power to the supporting frame 9 is good compared to that in a case in which the power is transmitted to the supporting frame 9 via other member.

The supporting frame 9 is a supporting member connected to the foot resting cushion 4a shown in FIG. 1 and used for supporting the calf of a leg of a user. The supporting frame 9 is a metallic plate that is made of a metallic material and is rectangular. The supporting frame 9 has back ends at both sides, and the back ends are tiltably connected to the front end of the seat or the fixing member 5. The supporting frame 9 tilts around the back ends of both sides and is tiltable between the stowage position below the front end of the seat and the foot resting position in front of the seat. The back side at the front of the supporting frame 9 is connected to the driving shaft 7.

The driving shaft 7 and the supporting frame 9 relating to the present invention are connected to the front end of the seat or the fixing member 5, and the connecting position of the supporting frame 9 is higher than the connecting position of the driving shaft 7. When the supporting frame 9 is stopped at the stowage position below the front end of the seat, the supporting frame 9 and the driving shaft 7 are approximately vertically arranged. According to this condition, a space for arranging the driving shaft 7 under the seat is not required, whereby the electrically operated ottoman apparatus 1 can be small in size. According to the positional relationship of the driving shaft 7 and the supporting frame 9 connected to the front end of the seat or the fixing member 5, when the supporting frame 9 is linearly moved over the driving shaft 7 in a direction from the upper end to the lower end of the driving shaft 7, the driving shaft 7 and the supporting frame 9 tilt to a substantially horizontal position in front of the seat. That is, the driving shaft 7 forms an angle with respect to the vertical direction, and the angle is increased as the supporting frame 9 moves to the foot resting position in front of the seat. According to this structure, the driving shaft 7 tilts around the end thereof toward the substantially horizontal position in front of the seat, whereby the transmission direction of the power of the driving shaft 7 is changed to the moving direction of the supporting frame 9. Therefore, the transmission efficiency of the power to the supporting frame is good.

Operation of the First Embodiment

Figure 5A:
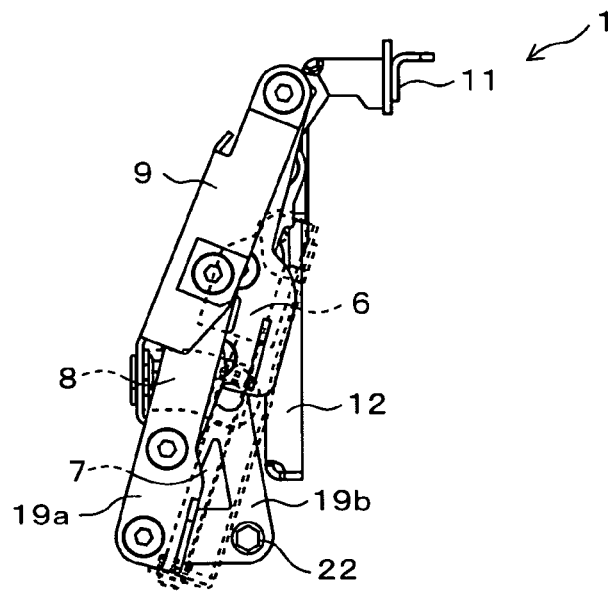
FIG. 5A is a side view of an electrically operated ottoman apparatus that is stopped at a stowage position.
Figure 5B:
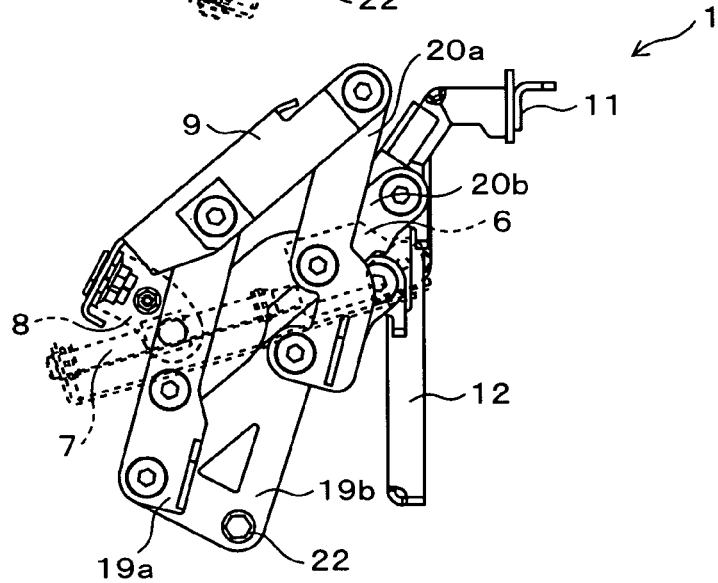
FIG. 5B is a side view of an electrically operated ottoman apparatus that is being extended.
Figure 5C:
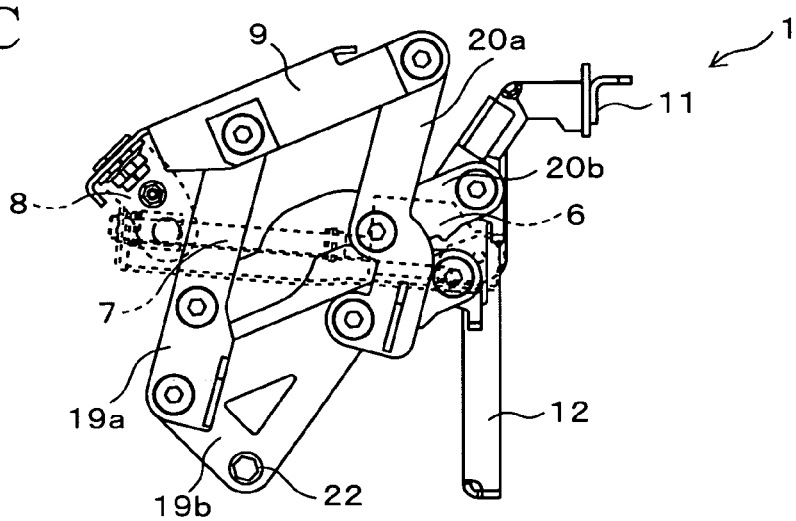
FIG. 5C is a side view of an electrically operated ottoman apparatus that is stopped at a foot resting position.

Hereinafter, an operation of the first embodiment is described with reference to FIGS. 5A to 5C. FIG. 5A is a side view of an electrically operated ottoman apparatus that is stopped at a stowage position, FIG. 5B is a side view of an electrically operated ottoman apparatus that is being extended, and FIG. 5C is a side view of an electrically operated ottoman apparatus that is stopped at a foot resting position.

When a user depresses the extending switch of the electrically operated ottoman apparatus 1, the supporting frame 9 connected to the driving shaft 7 linearly moves in a direction from the upper end to the lower end of the driving shaft 7. Then, according to the positional relationship of the driving shaft 7 and the supporting frame 9 connected to the front end of the seat or the fixing member 5, the driving shaft 7 tilts around the upper end thereof toward the substantially horizontal position in front of the seat. As the condition changes from FIGS. 5A to 5C, the supporting frame 9 moves from the stowage position below the front end of the seat to the foot resting position in front of the seat. By stopping the depressing of the extending switch, or by the lower end limiting switch provided to the driving shaft 7, the supporting frame 9 is stopped at an appropriate foot resting position. When the supporting frame 9 is stopped at the foot resting position in front of the seat, the driving shaft 7 is approximately horizontally arranged. According to this condition, the driving shaft 7 is approximately horizontally arranged at the foot resting position and directly maintains the supporting frame 9, whereby the strength for maintaining the supporting frame 9 is large compared to that of a structure maintaining the supporting frame via other member.

When the stowing switch is depressed, the supporting frame 9 connected to the driving shaft 9 linearly moves in a direction from the lower end to the upper end of the driving shaft 7. Then, according to the positional relationship and the connecting relationship of the driving shaft 7 and the supporting frame 9, the driving shaft 7 tilts around the upper end thereof to the lower portion of the front end of the seat. As the condition changes from FIG. 5C to 5A, the supporting frame 9 moves from the foot resting position in front of the seat to the stowage position below the front end of the seat. By stopping the depressing of the stowing switch, or by the upper end limiting switch provided to the driving shaft 7, the supporting frame 9 is stopped at the stowage position. When the supporting frame 9 is stopped at the stowage position below the front end of the seat, the supporting frame 9 and the driving shaft 7 are approximately vertically arranged below the front end of the seat. Therefore, the electrically operated ottoman apparatus 1 can be small in size.

Advantages of the First Embodiment

The advantages of the first embodiment are described hereinafter. In a conventional ottoman apparatus, a driving shaft may be approximately horizontally arranged under a seat, and a space below the seat is therefore required. In contrast, the supporting frame 9 and the driving shaft 7 are approximately vertically arranged below the front end of the seat in a stowed condition, whereby the electrically operated ottoman apparatus 1 can be small in size. In this case, the space under the seat is not used, whereby the space may be used for placing an air-conditioner for sending an airflow from the seat or a power device for moving the seat, for example.

The driving shaft 7 is directly connected to the supporting frame 9, whereby the power of the driving shaft 7 is directly transmitted to the supporting frame 9. Therefore, the transmission efficiency of the power to the supporting frame 9 is good compared to that in a case in which the power is transmitted to the supporting frame via other member. The driving shaft 7 is tilted around the end thereof to a substantially horizontal position as the supporting frame 9 moves to the foot resting position in front of the seat. That is, the angle of the driving shaft 7 with respect to the vertical direction is increased as the supporting frame 9 moves to the foot resting position in front of the seat. Therefore, the transmission direction of the power of the driving shaft 7 is changed to the moving direction of the supporting frame 9, whereby the transmission efficiency of the power to the supporting frame 9 is good.

When the supporting frame 9 is stopped at the foot resting position in front of the seat, the driving shaft 7 is approximately horizontally arranged. The driving shaft 7 is approximately horizontally arranged at the foot resting position and directly maintains the supporting frame 9, whereby the strength for maintaining the supporting frame is large compared to that of a structure maintaining the supporting frame via other member.

2. Second Embodiment

In the second embodiment, an example of an ottoman apparatus relating to the first embodiment is described, and the ottoman apparatus specifically includes a primary link that is connected to a driving shaft so as to be linearly movable on the driving shaft. In this case, descriptions for the structures that are the same as the structures in the first embodiment are quoted from the descriptions in the first embodiment.

Structure and Advantages of the Second Embodiment

As shown in FIG. 3, the ottoman apparatus 1 includes a primary link 8. The primary link 8 is a connecting member for transmitting the power from the driving shaft 7 to the supporting frame 9. The primary link 8 includes a pair of L-shaped metallic plates that are tiltably connected to both sides of the driving shaft 7. For example, when a solenoid, a pneumatic cylinder, or a hydraulic cylinder is used as the driving shaft 7, an engaging pin is provided to both sides of a core of the solenoid or a piston of the cylinder so that the engaging pins protrude, and the primary link 8 is tiltably connected to the engaging pins. The primary link 8 is fixed to the back surface of the supporting frame 9 with a bolt. According to this connecting structure, when the core of the solenoid or the piston of the cylinder is moved to the axial direction thereof, since the primary link 8 is engaged to the core of the solenoid or the piston of the cylinder, the primary link 8 is linearly movable in the axial direction. According to the structure in which the primary link 8 is connected to the driving shaft 7 so as to be linearly movable on the driving shaft 7, the connecting structure of the supporting frame 9 is simple compared to that in a case in which the supporting frame 9 is directly connected to the driving shaft 7.

3. Third Embodiment

In the third embodiment, an example of an ottoman apparatus relating to the first and the second embodiments is described, and the ottoman apparatus specifically includes a screw shaft as the driving shaft and includes a nut which engages with the screw shaft and is tiltably connected to the supporting frame or the primary link. In this case, descriptions for structures that are the same as the structures in the first or the second embodiment are quoted from the descriptions in the first or the second embodiment.

Structure and Advantages of the Third Embodiment

As shown in FIG. 3, the electrically operated ottoman apparatus 1 has a screw shaft as the driving shaft 7. The screw shaft engages with a nut 17 made of a cubic-shaped metallic material. The nut 17 is provided with an engaging pin at both sides thereof, and the engaging pins of the nut 17 are tiltably connected to the supporting frame 9 or the primary link 8. When the screw shaft is rotated by the electric motor 15 of the driving device 6, the nut 17 linearly moves on the screw shaft. When the nut 17 linearly moves on the screw shaft, the supporting frame 9 or the primary link 8 can linearly move over the screw shaft according to the movement of the nut 17. In this case, when the nut 17 linearly moves on the screw shaft in accordance with the rotation of the screw shaft, and the supporting frame 9 connected to the nut is stopped at the foot resting position in front of the seat, the supporting frame 9 is automatically locked at the stopped position by the nut 17 engaging with the screw shaft. Therefore, the strength for maintaining the supporting frame 9 is larger compared to that in a case in which the present invention is not used.

4. Fourth Embodiment

In the fourth embodiment, an example of an ottoman apparatus relating to the third embodiment is described, and the ottoman apparatus specifically includes a shaft supporting member for rotatably supporting an end of the screw shaft. In this case, descriptions for the structures that are the same as the structures in the third embodiment are quoted from the description of the third embodiment.

Structure and Advantages of the Fourth Embodiment

The electrically operated ottoman apparatus 1 includes a shaft supporting member 21 for rotatably supporting an end of a screw shaft used as the driving shaft 7. The shaft supporting member 21 is made of a metallic material and is U-shaped in cross section. An upper end of the shaft supporting member 21 is fixed to the outside of a gear unit 16 of the driving device 6, and a lower end of the shaft supporting member 21 is provided with a fitting hole for rotatably supporting the screw shaft. A lower end of the screw shaft is closely fitted into the fitting hole provided to the lower end of the shaft supporting member 21. A portion of the lower end of the screw shaft, which will be closely fitted, is coated with a lubricant such as a grease so as to reduce friction caused by the rotation of the screw shaft. According to the structure in which the shaft supporting member 21 for rotatably supporting the screw shaft is provided, the shaft supporting member 21 prevents vibration of the screw shaft, which occurs in accordance with the rotation of the screw shaft, whereby the power of the screw shaft is efficiently transmitted to the supporting frame 9 compared to a case in which the present invention is not used.

5. Fifth Embodiment

In the fifth embodiment, an example of an ottoman apparatus relating to the first embodiment is described, and the ottoman apparatus specifically includes two first tilting links that are tiltably connected to sides of the front end of the seat and are connected to both sides of the supporting frame. In this case, descriptions for the structures that are the same as the structures in the first to the fourth embodiment are quoted from the description of the first to the fourth embodiment.

Structure and Advantages of the Fifth Embodiment

The electrically operated ottoman apparatus 1 includes first tilting links 19, as shown in FIGS. 3 and 4. The first tilting link 19 is formed by tiltably connecting two plates 19a and 19b made of a metallic material, and the first tilting link 19 has an approximately V-shape in an extended condition and is linearly folded in a stowed condition. A first tilting link 19 is provided at both sides of the electrically operated ottoman apparatus 1 and tiltably connects the supporting frame 9 and one of the front end of the seat and the fixing member 5. That is, the first tilting links 19 are tiltably connected to a pair of holes 9b provided to the sides of the supporting frame 9. The first tilting links 19 are also tiltably connected to the front end of the seat or both sides of a fixing frame 14 provided to an upper side of the fixing member 5. In this case, the supporting frame 9 is maintained by the two first tilting links 19 at the two sides thereof, whereby the strength for maintaining the supporting frame 9 is high.

6. Sixth Embodiment

In the sixth embodiment, an example of an ottoman apparatus relating to the fifth embodiment is described, and the ottoman apparatus specifically includes two second tilting links that are tiltably connected to sides of the front end of the seat and are connected to the first tilting links. The first tilting links and the second tilting links set the stowage position below the front end of the seat and the foot resting position in front of the seat. In this case, descriptions for the structures that are the same as the structures in the fifth embodiment are quoted from the description of the fifth embodiment.

Structure of the Sixth Embodiment

The electrically operated ottoman apparatus 1 includes second tilting links 20, as shown in FIGS. 3 and 4. The second tilting link 20 is formed by tiltably connecting two plates 20a and 20b made of a metallic material, and the second tilting link 20 has an approximately X-shape in an extended condition and is linearly folded in a stowed condition. A second tilting link 20 is provided at both sides of the electrically operated ottoman apparatus 1 and tiltably connect the supporting frame 9 and one of the front end of the seat and the fixing member 5. That is, the second tilting links 20 are tiltably connected to holes 9a of a pair of arms provided at a back end of the supporting frame 9. The second tilting links 20 are also tiltably connected to the front end of the seat or both sides of the fixing frame 14 provided to the upper side of the fixing member 5. In this case, the supporting frame 9 is maintained by the pair of the second tilting links 20 at both sides thereof, whereby the strength for maintaining the supporting frame 9 is high.

The second tilting links 20 are connected to the first tilting links 19, as shown in FIG. 4. The plate 19a of the first tilting link 19 and the plate 20a of the second tilting link 20, and the plate 19b of the first tilting link 19 and the plate 20b of the second tilting link 20, are connected so as to be parallel each other in an extended condition and a stowed condition. The first tilting links 19 and the second tilting links 20 are extendibly arranged between the supporting frame 9 and one of the front end of the seat and the fixing member 5. According to this structure, the supporting frame 9 is not directly connected to the front end of the seat or the fixing member 5, and the first tilting links 19 and the second tilting links 20 set the stowage position below the front end of the seat and the foot resting position in front of the seat. In this case, the supporting frame 9 is smoothly tilted around a virtual rotational center, which is behind a knee of a user, in such a way that the supporting frame is pushed out to the front of the seat, whereby the ottoman apparatus is comfortable for the user.

Operation of the Sixth Embodiment

Hereinafter, an operation of the sixth embodiment will be described with reference to FIGS. 5A to 5C. When a user depresses the extending switch of the electrically operated ottoman apparatus 1, the supporting frame 9 or the primary link 8 connected to the driving shaft 7 linearly moves in a direction from the upper end to the lower end of the driving shaft 7. According to the positional relationship and the connecting relationship of the driving shaft 7 and the supporting frame 9, the driving shaft 7 tilts around the upper end thereof to a substantially horizontal position in front of the seat. Then, as the condition changes from FIGS. 5A to 5C, the supporting frame 9 moves from the stowage position below the front end of the seat to the foot resting position in front of the seat. In this case, the first tilting links 19 and the second tilting links 20 smoothly tilt while pushing the supporting frame 9 to the front of the seat, and set the position of the supporting frame 9. By stopping the depressing of the extending switch, or by the lower end limiting switch provided to the driving shaft 7, the supporting frame 9 is stopped at an appropriate foot resting position.

On the other hand, when the stowing switch is depressed, the supporting frame 9 connected to the driving shaft 7 linearly moves in a direction from the lower end to the upper end of the driving shaft 7. According to the positional relationship and the connecting relationship of the driving shaft 7 and the supporting frame 9, the driving shaft 7 tilts around the upper end thereof to the lower portion of the front end of the seat. Then, as the condition changes from FIGS. 5C to 5A, the supporting frame 9 moves from the foot resting position in front of the seat to the stowage position below the front end of the seat. In this case, the first tilting links 19 and the second tilting links 20 smoothly tilt while pulling down the supporting frame 9 to the lower portion of the front end of the seat, and set the position of the supporting frame 9. By stopping the depressing of the stowing switch, or by the upper end limiting switch provided to the driving shaft 7, the supporting frame 9 is stopped at the stowage position. When the supporting frame 9 is stopped at the stowage position below the front end of the seat, the first tilting links 19 and the second tilting links 20 are approximately vertically folded. In this case, the ottoman apparatus is small in size.

Advantages of the Sixth Embodiment

The advantages of the sixth embodiment is described hereinafter. The supporting frame 9 is maintained by the two tilting links, that is, the pair of the first tilting links 19 and the pair of the second tilting links 20 at both sides thereof, whereby the strength for maintaining the supporting frame 9 is high. By the first tilting links 19 and the second tilting links 20, the supporting frame 9 is smoothly tilted around a virtual rotational center, which is behind a knee of a user, in such a way that the supporting frame is pushed forward, and is positioned. Therefore, the ottoman apparatus is comfortable for the user. When the supporting frame 9 is stopped at the stowage position below the front end of the seat, the first tilting links 19 and the second tilting links 20 are approximately vertically folded, whereby the ottoman apparatus is small in size.

7. Seventh Embodiment

In the seventh embodiment, an example of an ottoman apparatus relating to the fifth and the sixth embodiments is described, and the ottoman apparatus specifically includes a connecting rod for connecting the pair of the first tilting links or the pair of the second tilting links at both sides thereof. In this case, descriptions for the structures that are the same as the structures in the fifth and the sixth embodiments are quoted from the description of the fifth and the sixth embodiments.

Structure and Advantages of the Seventh Embodiment

The electrically operated ottoman apparatus 1 includes a connecting rod 22 as shown in FIG. 3. The connecting rod 22 is made of a metallic material and is formed into a rod shape, and the connecting rod 22 connects the pair of the first tilting links 19 or the second tilting links 20 at both sides of the ottoman apparatus 1 with a bolt. When the connecting rod 22 connects the pair of the first tilting links 19 at both sides of the ottoman apparatus 1, the lower end of the plate 19b of the first tilting link 19 is formed into a triangle shape shown in FIG. 5A, so that the connecting rod 22 does not interfere with the driving shaft 7. In this case, the connecting rod 22 is connected to the top of the triangle shape of the plate 19b of the first tilting link 19. On the other hand, when the connecting rod 22 connects the pair of the second tilting links 20 at both sides of the ottoman apparatus 1, the connecting rod 22 is connected to the upper end portion of the plate 20a of the second tilting link 20 in order not to interfere with the driving shaft 7. According to this structure, the tilting motions of the pair of the first tilting links or the tilting motions of the pair of the second tilting links at both sides of the ottoman apparatus 1 are synchronized by the connecting rod. Therefore, the first tilting links or the second tilting links securely maintain the supporting frame without vibrating the supporting frame in right and left direction during extending operation and stowing operation.

INDUSTRIAL APPLICABILITY

The present invention may be used for ottoman apparatuses to be mounted to seats for vehicle, such as automobiles and trains, and seats for air planes.

What is claimed is:

1. An ottoman apparatus for a vehicle seat, comprising:
    a driving shaft having an end connected to a front end of the seat, the driving shaft having another end which is tiltable around the connected end; and
    a supporting frame connected to the driving shaft so as to be linearly movable over the driving shaft, the supporting frame being movable between a stowage position below the front end of the seat and a foot resting position in front of the seat by linearly moving over the driving shaft when the supporting frame is driven by the driving shaft,
    wherein the driving shaft tilts around the front end of the seat and the another end of the driving shaft moves from a lower side of the front end of the seat to the front of the seat according to the movement of the supporting frame to the foot resting position in front of the seat,
    the driving shaft forms an angle with respect to a vertical direction, and the angle is increased as the supporting frame moves to the foot resting position in front of the seat, and
    the ottoman apparatus includes a primary link that is connected to the driving shaft so as to be linearly movable on the driving shaft, and the primary link transmits power to the supporting frame.

2. The ottoman apparatus for the vehicle seat according to claim 1, wherein the driving shaft is approximately horizontally arranged when the supporting frame is stopped at the foot resting position in front of the seat.

3. The ottoman apparatus for the vehicle seat according to claim 1, wherein the driving shaft is a screw shaft engaged with a nut that is tiltably connected to the supporting frame.

4. The ottoman apparatus for the vehicle seat according to claim 3, wherein the screw shaft has an end, and the ottoman apparatus includes a shaft supporting member for rotatably supporting the end of the screw shaft.

5. The ottoman apparatus for a vehicle seat according to claim 1,
wherein:
the driving shaft is connected to the front end of the seat via a securing member and disposed in front of the seat, and
the another end of the driving shaft positioned in front of the seat tilts from the lower side of the front end of the seat to the front of the seat when the supporting frame is moved from a position in which a foot is not rested to the foot resting position, and there is no space for retaining the driving shaft in the lower side of the seat.

6. The ottoman apparatus for a vehicle seat according to claim 1,
wherein:
the driving shaft is connected to the front end of the seat via a securing member and disposed in front of the seat, and
the driving shaft positioned in front of the seat tilts from a substantially vertical position to a substantially horizontal position when the supporting frame is moved from a position in which a foot is not rested to the foot resting position, and there is no space for retaining the driving shaft in a lower side of the seat.

7. The ottoman apparatus for a vehicle seat according to claim 1, wherein the apparatus further comprises:
a bearing member for supporting the driving shaft, the bearing member being positioned in front of the seat and tilting with the driving shaft, and
driving means for driving the driving shaft and mounted to the bearing member,
wherein the driving means is mounted to the bearing member, thereby there is no space for retaining the driving means in a lower side of the seat.

8. The ottoman apparatus for a vehicle seat according to claim 1, wherein the apparatus further comprises:
a bearing member for supporting the driving shaft, the bearing member being positioned in front of the seat and tilting with the driving shaft,
a gear unit for rotating the driving shaft and mounted to the bearing member, and
a motor connected to the gear unit and positioned in front of the seat,
wherein there is no space for retaining the motor in a lower side of the seat.

9. An ottoman apparatus for a vehicle seat, comprising:
a driving shaft having an end connected to a front end of the seat, the driving shaft having another end which is tiltable around the connected end; and
a supporting frame connected to the driving shaft so as to be linearly movable over the driving shaft, the supporting frame being movable between a stowage position below the front end of the seat and a foot resting position in front of the seat by linearly moving over the driving shaft when the supporting frame is driven by the driving shaft,
wherein the driving shaft tilts around the front end of the seat and the another end of the driving shaft moves from a lower side of the front end of the seat to the front of the seat according to the movement of the supporting frame to the foot resting position in front of the seat, and the driving shaft forms an angle with respect to a vertical direction, and the angle is increased as the supporting frame moves to the foot resting position in front of the seat, and
wherein the ottoman apparatus includes a pair of first tilting links which are tiltably connected to both sides of the front end of the seat and are connected to both sides of the supporting frame.

10. The ottoman apparatus for the vehicle seat according to claim 9, wherein the ottoman apparatus includes a pair of second tilting links which are tiltably connected to both sides of the front end of the seat and are connected to the first tilting links, and the first tilting links and the second tilting links set the stowage position below the front end of the seat and the foot resting position in front of the seat.

11. The ottoman apparatus for the vehicle seat according to claim 10, wherein the first tilting links and the second tilting links are approximately vertically folded when the supporting frame is stopped at the stowage position below the front end of the seat.

12. The ottoman apparatus for the vehicle seat according to claim 11, wherein the ottoman apparatus includes a connecting rod connecting the pair of the first tilting links or the pair of the second tilting links.

\* \* \* \* \*